United States Patent
Ito et al.

[11] Patent Number: 5,477,389
[45] Date of Patent: Dec. 19, 1995

[54] FAST ULTRA-WIDE ANGLE LENS SYSTEM

[75] Inventors: Takayuki Ito; Yasuyuki Sugano, both of Tokyo, Japan

[73] Assignees: Asahi Kogaku Kogyo Kabushiki Kaisha; Asahi Seimitsu Kabushiki Kaisha, both of Tokyo, Japan

[21] Appl. No.: 260,837

[22] Filed: Jun. 16, 1994

[30] Foreign Application Priority Data

Jun. 18, 1993 [JP] Japan ................... 5-147829

[51] Int. Cl.⁶ ................... G02B 13/04
[52] U.S. Cl. ................... 359/752; 359/749; 359/708; 359/755; 359/762
[58] Field of Search ................... 359/749, 750, 359/751, 752, 753, 755, 762, 691

[56] References Cited

U.S. PATENT DOCUMENTS

| | | | |
|---|---|---|---|
| 3,029,699 | 5/1959 | Brewer et al. | 359/749 |
| 3,738,738 | 6/1973 | Takahashi | 350/214 |
| 3,870,402 | 3/1975 | Takahashi et al. | 350/214 |
| 3,975,091 | 8/1976 | Takahashi | 350/214 |
| 4,487,485 | 12/1984 | Hisada | 350/459 |
| 4,566,764 | 1/1986 | Matsuo | 350/459 |
| 5,162,945 | 11/1992 | Matsuo et al. | 359/646 |

*Primary Examiner*—Georgia Y. Epps
*Assistant Examiner*—Dawn-Marie Bey
*Attorney, Agent, or Firm*—Sandler, Greenblum, & Bernstein

[57] ABSTRACT

A fast ultra-wide angle lens system is provided which includes a front lens group having a negative power, a diaphragm, and a rear lens group having a positive power, arranged in this order from a side of an object to be photographed. The lens system satisfies the following conditions:

(1) $-0.5 < f/f_F < -0.2$;

(2) $7.0 < \Sigma d_{F+S}/f < 12.0$; and (3) $5.0 < \Sigma d_R/f < 10.0$, wherein f represents a focal length of the entire lens system, $f_F$ represents a focal length of the front lens group, $\Sigma d_{F+S}$ represents a sum of the length of the front lens group and a distance between the front lens group and the rear lens group, and $\Sigma d_R$ represents a length of the rear lens group.

4 Claims, 4 Drawing Sheets

FIG. 1
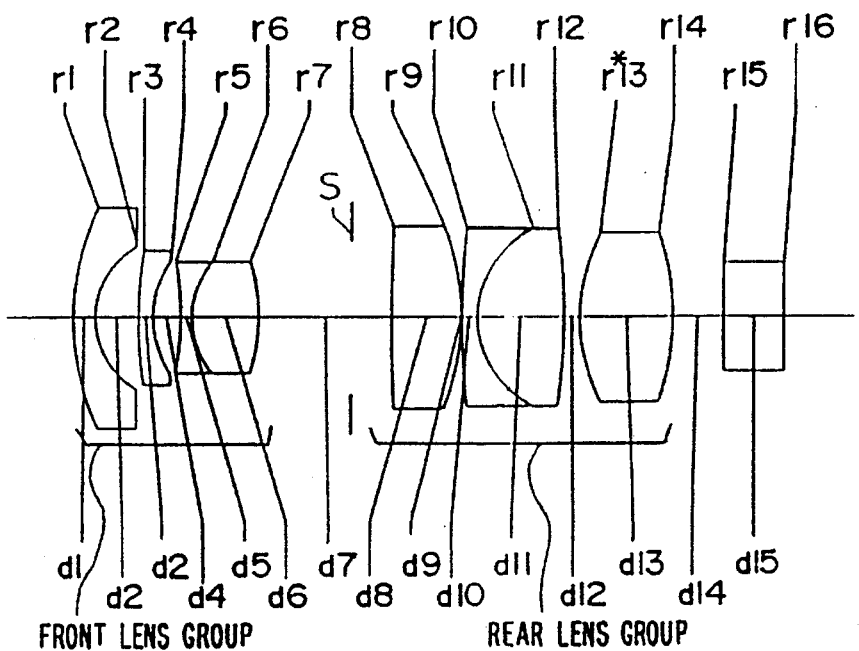
FRONT LENS GROUP    REAR LENS GROUP
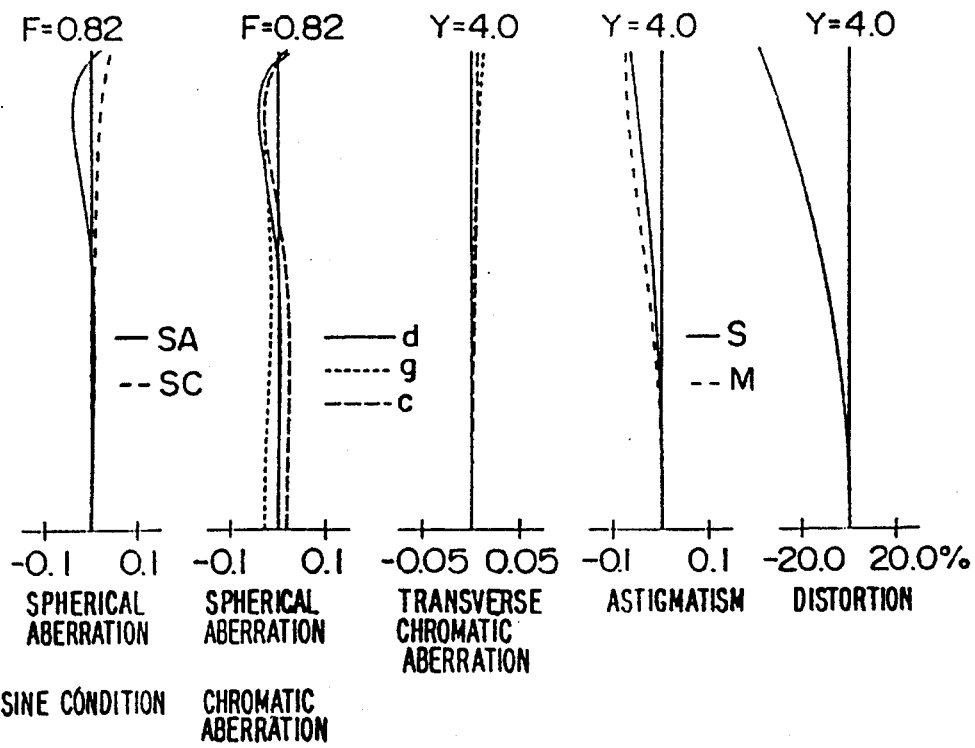
FIG. 2

FIG. 7
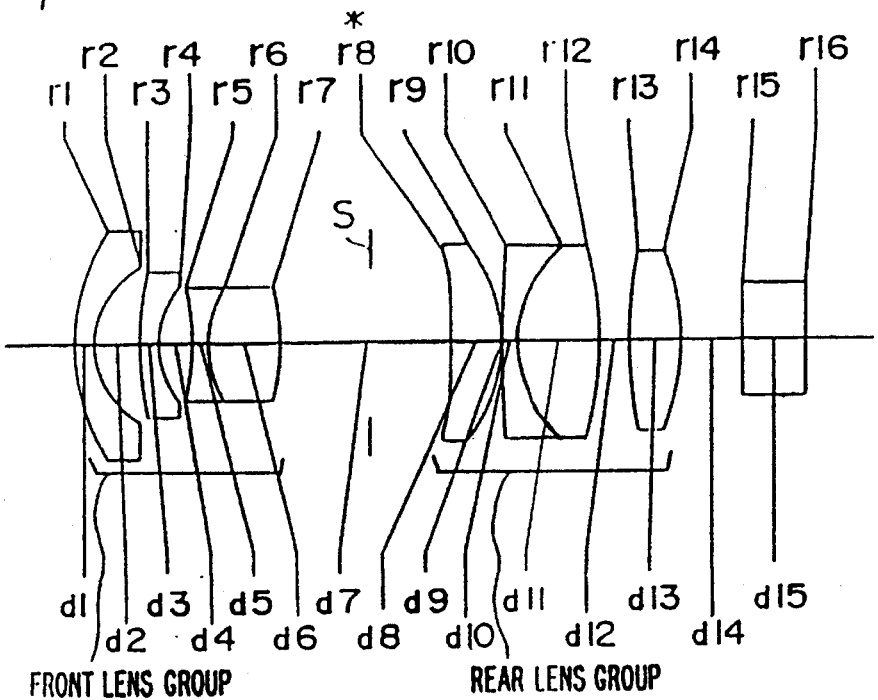
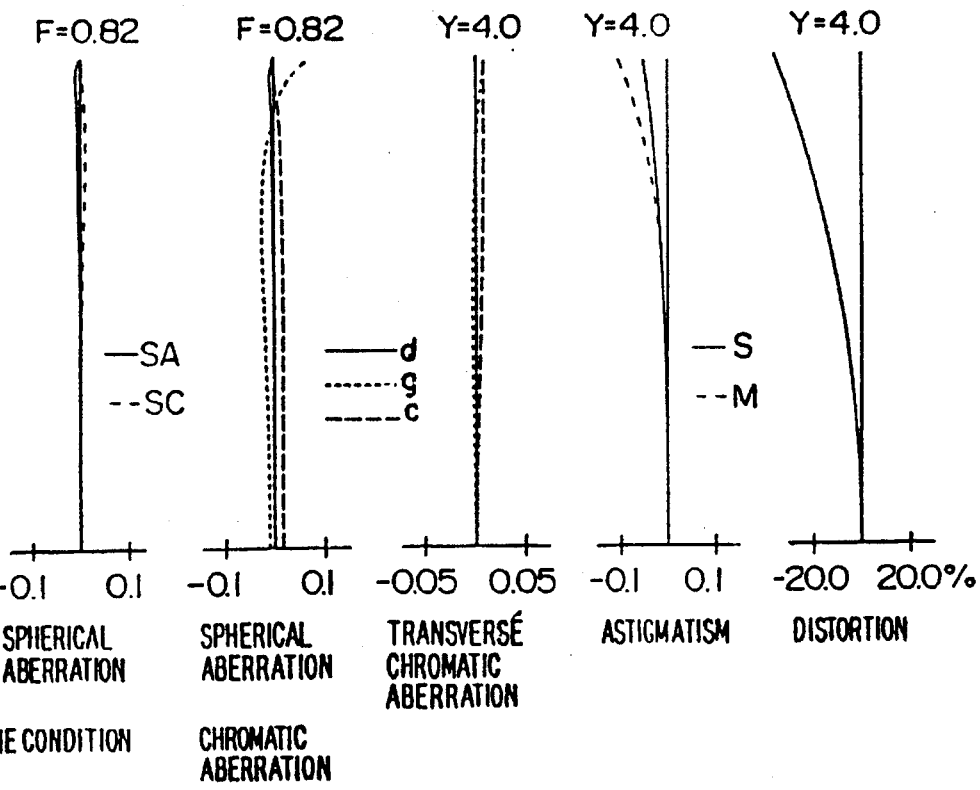
FIG. 8

FAST ULTRA-WIDE ANGLE LENS SYSTEM

BACKGROUND OF THE INVENTION

1. Field of the Invention

The present invention relates to a fast ultra-wide angle lens system which can be advantageously used in a small TV camera, such as a CCTV camera or the like.

2. Description of Related Art

In a known small TV camera, a small image pickup device of high resolution whose pixels are small is usually used. To this end, a fast lens having a small f-number is required as a photographing lens, i.e., filming lens. In the conventional fast lenses, however, the f-number is F1.0 to F1.2.

It is an object of the present invention to provide a fast ultra-wide angle lens system having an extremely small f-number, i.e., around F0.8, and a half angle of view which is approximately equal to 60°.

SUMMARY OF THE INVENTION

To achieve the object mentioned above, according to an aspect of the present invention, a fast ultra-wide angle lens system is provided, comprising a front lens group having a negative power, a diaphragm, and a rear lens group having a positive power, arranged in this order from the side of an object to be photographed, in which the following conditions are satisfied:

(1) $-0.5 < f/f_F < -0.2$ (2) $7.0 < \Sigma d_{F+S}/f < 12.0$ (3) $5.0 < \Sigma d_R/f < 10.0$ wherein, $f$ represents a focal length of the entire lens system, $f_F$ represents a focal length of the front lens group, $\Sigma d_{F+S}$ represents a sum of the length of the front lens group and the distance between the front lens group and the rear lens group; and, $\Sigma d_R$ represents a length of the rear lens group.

Preferably, a lens having an aspherical surface is provided in the rear lens group which satisfies the following conditions;

(4) $-10.0 < \Delta I_{ASP} < -1.0$ (5) $|I_{SP}/\Delta I_{ASP}| < 0.2$ wherein $\Delta I_{ASP}$ represents an aberration factor of the aspherical surface term of the third-order spherical aberration factor of the aspherical lens surface (i.e., aberration factor when the focal length is converted to be 1.0), $I_{SP}$ represents an aberration factor of the spherical surface term of the third-order spherical aberration factor of the aspherical lens surface.

The amount of variation in the coefficient of the third order aberration due to the aspheric surface will now be described. The shape of the aspheric surface can be generally expressed as follows.

$$X = \frac{Cr^2}{1 + \{1 - (1+K)C^2Y^2\}^{1/2}} + A_4 Y^4 + A_6 Y^6 + A_8 Y^8 + A_{10} Y^{10} + \ldots$$

wherein, Y represents a height above the axis,

X represents a distance from a tangent plane of an aspherical vertex,

C represents a curvature of the aspherical vertex (1/r)

k represents a conic constant, $A_4$ represents a fourth-order aspherical aberration factor, $A_6$ represents a sixth-order aspherical aberration factor, $A_8$ represents a eighth-order aspherical aberration factor; and, $A_{10}$ represents a tenth-order aspherical aberration factor.

When the focal length f is 1.0, the resultant value is transformed as follows. Namely, substitute the following equations into the above equation:

$X = x/f,\ Y = y/f,\ C = fc$ $\alpha_4 = f^3 A_4,\ \alpha_6 = f^5 A_6,\ \alpha_8 = f^7 A_8,\ \alpha_{10} = f^9 A_{10}$ In this way, the following equation is obtained.

$$X = \frac{CY^2}{1 + (1 - C^2 Y)^{1/2}} + \alpha_4 Y^4 + \alpha_6 Y^6 + \alpha_8 Y^8 + \alpha_{10} Y^{10} + \ldots$$

The second and subsequent terms define the amount of asphericity of the aspheric surface.

The relationship between the coefficient $A_4$ of the second term and the coefficient of the third-order aspheric surface $\Phi$ is expressed by:

$\Phi = 8(N' - N)\alpha_4$ wherein N is the refractive index of a material nearer the object side with regard to the aspherical surface, and N' is the refractive index of a material behind the aspherical surface.

The coefficient of the aspherical surface $\Phi$ provides the following amount of variation in the coefficients of the various kinds of third-order aberration.

$\Delta I = h^4 \Phi$ $\Delta II = h^3 k \Phi$ $\Delta III = h^2 k^2 \Phi$ $\Delta IV = h^2 k^2 \Phi$ $\Delta V = h k^3 \Phi$ wherein I is the spherical aberration coefficient, II is the coma coefficient, IV is the curved surface coefficient of aspherical image absent surface, V is a distortion coefficient, h is the height of paraxial and off-axis rays passing through each lens surface; and, k is the height of paraxial and off-axis rays passing through the center of the pupil and each lens surface.

The shape of aspheric surface can be expressed by various other equations but when y is smaller than the paraxial radius of curvature, satisfactory approximation can be achieved by even-order terms alone. Hence, it should be understood that the applicability of the present invention is in no way compromised by merely changing the equations for expressing the shape of the aspheric surface.

$\Phi I$ set forth above corresponds to $\Phi ASP$ in the present invention.

The rear lens group can be comprised of a positive lens in which a surface facing an image surface of the lens system is convex. A cemented lens assembly comprising a negative lens and a positive lens and a positive double convex lens, arranged in this order from the object side. Cemented surfaces of the negative lens and the positive lens of the cemented lens assembly are concave with respect to the image surface. Preferably, in this arrangement, the rear lens group satisfies the following conditions;

(6) $0.3 < f_R/f_{R-o} < 0.6$ (7) $0.4 < f_R/f_{R-i} < 0.9$ (8) $2.0 < d_{O-i}/f < 5.0$ (9) $2.0 < r_{RC}/f < 5.0$ wherein, $f_R$ represents a focal length of the rear lens group, $f_{R-O}$ represents a focal length of the positive lens nearest to an object in the rear lens group, $f_{R-i}$ represents a focal length of the positive lens nearest to the image surface in the rear lens group, $d_{O-i}$ represents a distance between the rear surface of the positive lens nearest to the object and the front surface of the positive lens nearest to the image surface, in the rear lens group, $r_{RC}$ represents a radius of curvature of the cemented surfaces of the cemented lens assembly of the rear lens group.

The front lens group can be comprised of first and second negative meniscus lenses having convex surfaces facing the object, and a cemented lens assembly having a third negative lens and a fourth positive lens arranged in this order from the object side. Cemented surfaces of the third and fourth lenses are convex with respect to the object side. Preferably, in this arrangement, the following conditions are satisfied.

(10) $1.7 < (N_1 N_2 + N_3)/3$

(11) $1.7 < N_P$

(12) $10 < v_N - v_P$

(13) $1.5 < r_{FC}/f < 5.0$ wherein, $N_1$ represents a refractive index of the first negative lens of the front lens group, $N_2$ represents a refractive index of the second negative lens of the front lens group, $N_3$ represents a refractive index of the third negative lens of the front lens group, $N_P$ represents a refractive index of the fourth positive lens of the cemented lens assembly, $v_N$ represents an Abbe number of the fourth negative lens of the cemented lens assembly, $v_P$ represents an Abbe number of the third positive lens of the cemented lens assembly, $r_{FC}$ represents a radius of curvature of the cemented surfaces of the cemented lens assembly.

The present disclosure relates to subject matter contained in Japanese patent application No. 05-147829 (filed on Jun. 18, 1993) which is expressly incorporated herein by reference in its entirety.

BRIEF DESCRIPTION OF THE DRAWINGS

The invention will be described below in detail with reference to the accompanying drawings, in which;

FIG. 1 is a schematic view of a lens arrangement of the fast ultra-wide angle lens system according to a first embodiment of the present invention;

FIG. 2 shows diagrams of various aberrations in the lens system shown in FIG. 1;

FIG. 7 is a schematic view of a lens arrangement of the fast ultra-wide angle lens system according to a fourth embodiment of the present invention; and, FIG. 8 shows diagrams of various aberrations in the lens system shown in FIG. 7.

DESCRIPTION OF THE PREFERRED EMBODIMENT

Figure 3:
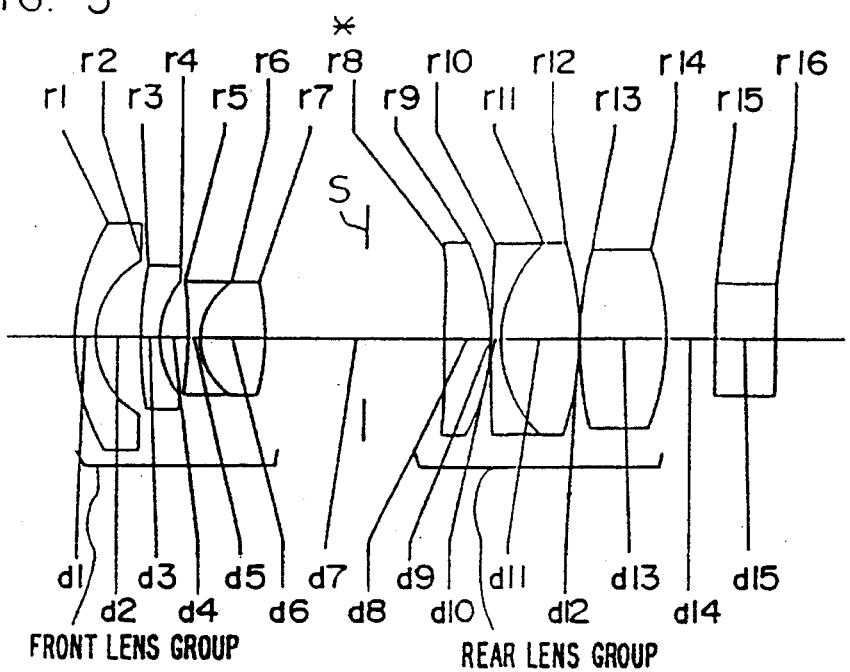
FIG. 3 is a schematic view of a lens arrangement of the fast ultra-wide angle lens system according to a second embodiment of the present invention.
Figure 4:
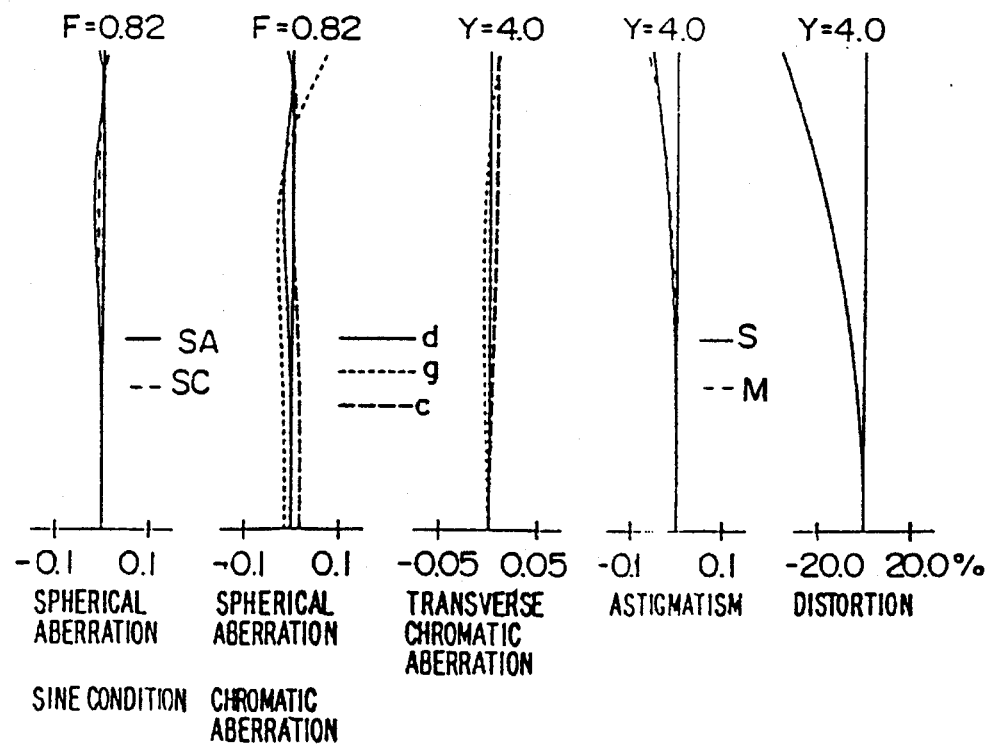
FIG. 4 shows diagrams of various aberrations in the lens system shown in FIG. 3.

A fast ultra-wide angle lens system according to the present invention is a retrofocus-type ultra-wide angle lens, comprising a front lens group having negative power and a rear lens group having positive power, located in this order from the side of an object to be photographed.

In the simplest structure, the diaphragm is provided between the front and rear lens groups that satisfy formula (1) $-0.5 < f/f_F < -0.2$, where f is the focal length of the entire lens system and $f_F$ is the focal length of the front lens group. This structure makes it possible to reduce the lens diameters of the front and rear lens groups while keeping the balance between the lens groups. In comparison with an arrangement in which the diaphragm is provided in the front lens group or the rear lens group, the optical property is little influenced by possible manufacturing errors of the lens system, such as a failure to an alignment of the lens axes, etc.

Moreover, in a small TV camera as mentioned above, in which an ND filter is usually provided in the vicinity of the diaphragm, the provision of the diaphragm between the rear lens group and the front lens group, in connection with the requirement represented by formula (1), contributes to an elimination of a ghost image due to the reflection of light by the surfaces of the ND filter and the image pickup device.

The formula (1) defines the power of the front lens group. If the value of $f/f_F$ exceeds the upper limit of $-0.2$, the backfocal distance decreases, resulting in a difficulty in incorporating the lens system in the camera. Conversely, if the value of $f/f_F$ is below the lower limit of $-0.5$, not only the entire lens length increases but also a high-order aberration tends to occur, due to the increased power of the lens groups.

The formula (2) $7.0 < \Sigma d_{F+S}/f < 12.0$, where $\Sigma d_{F+S}$ is the sum of the length of the front lens group and the distance between the front lens group and the rear lens group, is related to a requirement to increase a back-focal distance and to decrease f-number represented by the distance between a surface of the first lens nearer the object side in the front lens group and a surface of the first lens nearer the object in the rear lens group. If the value of the ratio in formula (2) exceeds the upper limit of 12.0, not only the entire lens length increases but also the diameter of the front lens group increases. Conversely, if the value is below the lower limit of 7.0, back-focal distance cannot be increased and it will be difficult to compensate for the aberration.

The formula (3) $5.0 < \Sigma d_R/f < 10.0$, where $\Sigma d_R$ is a length of the rear lens group, is related to a requirement to increase an aperture ratio, in connection with the length between front and rear surfaces of the rear lens group. If the value of the ratio in formula (3) exceeds the upper limit of 10.0, not only the entire lens length but also the diameter of the rear lens group increases. Conversely, if the value is below the lower limit, of 5.0 it is impossible to obtain a fast ultra-wide angle lens having a large back-focal distance.

The formulae (4) $-10.0<\Delta I_{ASP}<-1.0$, where $\Delta I_{ASP}$ is an aberration factor of the aspherical surface term of the third-order spherical aberration factor of the aspherical lens surface, and (5) $|I_{SP}/\Delta I_{ASP}|<.02$, where $I_{SP}$ is the aberration factor of the spherical surface term of the third-order spherical aberration factor of the aspherical lens surface, are related to the aspherical surface. The lens having the aspherical surface is preferably provided in the rear lens group in which a large diameter of the axial bundle of rays are obtained. Preferably, the aspherical surface is divergent which can effectively compensate the spherical and comatic aberration.

Figures 5, 6:
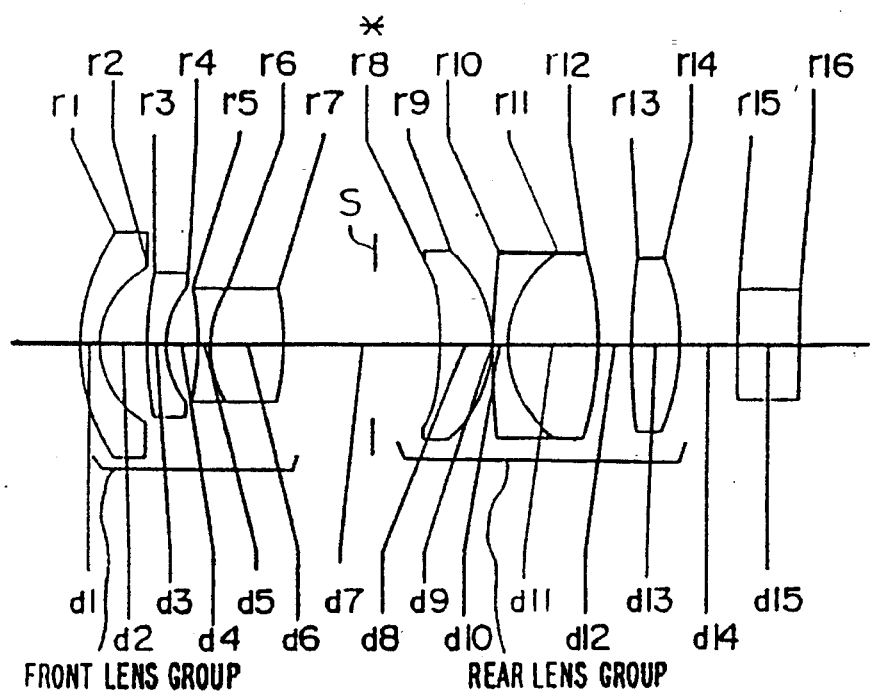
FIG. 5 is a schematic view of a lens arrangement of the fast ultra-wide angle lens system according to a third embodiment of the present invention.
FIG. 6 shows diagrams of various aberrations in the lens system shown in FIG. 5.

The diverging aspherical surface refers to an aspherical surface whose shape is such that the curvature decreases (i.e., radius of curvature increases) toward the peripheral edge of the lens if the aspherical surface is a convex surface, as shown in FIG. 1 (first embodiment), or an aspherical surface whose shape varies from the central portion which forms a convex surface toward the peripheral portion which forms a concave surface, as shown in FIG. 3 (second embodiment), or an aspherical surface whose shape is such that the curvature increases (i.e., radius of curvature decreases) toward the peripheral edge of the lens if the aspherical surface is concave, as shown in FIG. 5 or 7 (third or fourth embodiment), respectively.

If the value of $\Delta I_{ASP}$ in the formula (4) exceeds the upper limit of $-1.0$, an insufficient aspherical surface effect can be expected, and if the value is below the lower limit of $-1.0$, the aberration is excessively compensated (i.e. the aberration is overcompensated.)

The formula (5) specifies the location of the aspherical surface. Preferably, the aspherical surface is provided on a surface having a spherical surface term of the spherical aberration factor which satisfies the condition (5), because the optical efficiency of the lens system is less likely to be deteriorated by a possible manufacturing error.

The formulae (6) through (9) are related to the rear lens group. It is preferable that the two positive lenses, which are located nearest to the object side and nearest to the image surface in the rear lens group so as to satisfy the following conditions (6) $0.3<f_R/f_{R-0}<0.6$, where $f_R$ is the focal length of the rear lens group and $f_{R-0}$ is the focal length of the positive lens nearest to an object in the rear lens group and (7) $0.4<f_R/f_{R-i}<0.9$, where $f_{R-i}$ is a focal length of the positive lens nearest to the image surface in the rear lens group, have a power which is approximately half of the power of the rear lens group, and that the positive lenses are spaced from one another at a large distance which satisfies the requirement of the formula (8) $2.0<d_{O-i}/f<5.0$, where $d_{O-i}$ is a focal length of the positive lens nearest to the image surface in the rear lens group, so that the cemented lens assembly can be provided between the positive lenses so as to satisfy the formula (9), $2.0<r_{RC}/f<5.0$, where $r_{RC}$ is a radius of curvature of the cemented surfaces of the cemented lens assembly of the rear lens group.

If the value of the ratio in the formula (6) exceeds the upper limit of 0.6, the power of the positive lens on the object side of the rear lens group is too large, resulting in high-order aberration. In addition, it will be difficult to compensate for the comatic aberration while keeping the balance with the positive lens on the image side. Conversely, if the ratio is below the lower limit of 0.6, it will be difficult to compensate for the aberrations caused in the front lens group.

If the value of the ratio in the formula (7) exceeds the upper limit of 0.9, the power of the positive lens on the image side of the rear lens group is too large, thus a high-order aberration tends to occur. Conversely, if the ratio is below the lower limit of 0.4, it is difficult to maintain the balance of power between the positive lenses on the object side and the image side, thus it will be difficult to compensate for the comatic aberration.

If the value of the ratio in the formula (8) exceeds the upper limit of 5.0, the rear lens group becomes large, and if the ratio is below the lower limit of 2.0, it will be difficult to correct the astigmatism.

The formula (9) relates to the cemented lens assembly provided between the positive lenses on the object side and the image side. If the value of the ratio in the formula (9) exceeds the upper limit of 5.0, it is difficult to correct the chromatic aberration, the spherical aberration, and the comatic aberration in the rear lens group. Conversely, if the ratio is smaller than the lower limit of 2.0, the aberrations will be overcompensated.

The formulae (10) through (13) are related to the front lens group.

The formula (10), $1.7<(N_1+N_2+N_3)/3$, where $N_1$ is a refractive index of the first negative lens of the front lens group, and $N_3$ is a refractive index of the third negative lens of the front lens group, specifies refractive indexes of the three negative lenses of the front lens group. The three negative lenses are preferably made of a material of high refractive indexes, in which the mean refractive index is larger than the lower limit in the formula (10). Otherwise, it will be difficult to correct the astigmatism.

The formulae (11), (12) and (13) specify the requirements for the cemented lens assembly in the front lens group. It is preferable that the positive lens of the cemented lens assembly is made of a material of a high refractive index to reduce the field curvature, as indicated in the formula (11), $1.7<N_p$, where $N_p$ is a refractive index of the fourth positive lens of the cemented lens assembly. If the value of $N_p$ is smaller than the lower limit, it will be difficult to compensate the field curvature.

The formula (12), $10<\upsilon_N-\upsilon_p$, where $\upsilon_N$ is an Abbe number of the fourth negative lens of the cemented lens assembly and $\upsilon_p$ is an Abbe number of the third positive lens of the cemented lens assembly, specifies the Abbe number of the cemented lens assembly. If the value in the formula (12) is below the lower limit, it will be difficult to compensate the chromatic aberration in the front lens group.

The formula (13), $1.5<r_{FC}/f<5.0$, where $r_{FC}$ is the radius of curvature of the cemented surfaces of the cemented lens assembly, specifies a radius of curvature of the cementing surface of the cemented lens assembly. If the value of the ratio in the formula (13) exceeds the upper limit 5.0, it is difficult to correct the chromatic aberration in the front lens group. Conversely, if the value of the ratio is below the lower limit of 1.5, the high-order spherical and comatic aberration occurs due to the difference in the refractive index between the positive lens and the negative lens of the cemented lens assembly. Furthermore, it is necessary to increase the lens thickness of the positive lens in order to obtain the sufficient thickness at the peripheral edge of the lens. This results in an increase in the diameter of the front lens group.

First Embodiment:

FIG. 1 shows a first embodiment of a lens arrangement of the fast ultra-wide angle lens according to the present invention.

Hereinafter, the front lens group is referred to as the lens group I and the rear lens group is referred to as the lens group II.

The first lens group I which is located in front of a diaphragm S is comprised of first through fourth lenses. The second lens group II which is located behind the diaphragm S is comprised of fifth through eighth lenses. The third lens and the fourth lens are cemented to each other to form an cemented lens assembly. Also, the sixth lens and the seventh lens are adhered to form an cemented lens assembly. A plane-parallel plate is located behind the eighth lens.

Designations $r_1$–$r_{17}$ represent the radius of curvature for each given lens surface. Designations $d_1$–$d_{16}$ represent either the lens thickness or the distance between lenses. Diagrams of various aberrations of the lens system are shown in FIG. 2. In FIG. 2, "SA" represents a spherical aberration, "SC" represents the sine condition, "d-line", "g-line" and "C-line" represents a chromatic and the transverse chromatic aberration, represented by the spherical aberration, at the respective wavelengths, "S" represents the sagittal ray, and "M" represents the meridional ray.

Numerical data of the lens system shown in FIG. 1 is shown in Table 1 below. In Table 1 (and in the other Tables) and the figures of the drawings, "$r_i$" represents a radius of curvature of each lens surface, wherein i=1, 2, 3, . . . "$d_i$" represents a lens thickness or the distance between the lenses, wherein i=1, 2, 3, . . . "N" represents a refractive index, and "ν" represents an Abbe number.

Table 1

$F_{NO} = 1:0.82$ $\omega F = 60.0$ $F_B = d_{14} + d_{15}$ (in glass)=11.00
wherein, $F_{NO}$ represents f-number, f represents a focal length, ω represents a half angle of view; and, $f_B$ represents a back focal length.

Surface

| No. | r | d | N | ν |
|---|---|---|---|---|
| 1 | 25.181 | 2.26 | 1.77250 | 49.6 |
| 2 | 8.264 | 4.27 | 1.83481 | 42.7 |
| 3 | 44.052 | 1.50 | | |
| 4 | 9.920 | 2.80 | | |
| 5 | −30.455 | 1.10 | 1.82333 | 37.7 |
| 6 | 9.216 | 6.34 | 1.84666 | 23.9 |
| 7 | −18.870 | 12.81 | | |
| 8 | 285.710 | 6.86 | 1.71162 | 51.4 |
| 9 | −24.205 | 0.10 | | |
| 10 | 85.555 | 1.50 | 1.84666 | 23.9 |
| 11 | 9.889 | 8.48 | 1.65983 | 57.2 |
| 12 | −61.772 | 1.58 | | |
| 13* | 17.220 | 9.39 | 1.74320 | 49.3 |
| 14 | −24.924 | 5.00 | | |
| 15 | ∞ | 6.00 | 1.49782 | 66.8 |
| 16 | ∞ | | | |

*marked surface is aspherical.

surface No. 13;

K=0.0, A4=−0.39541×10⁻⁴, A6=−0.25900×10⁻⁸,

A8=−0.23530×10⁻⁸, A10=0.20854×10⁻¹⁰, A12=0.0

Aspherical surface is defined as follows;

$$x=cy^2/\{1+[1-(1+K)c^2y^2]^{1/2}\}+A_4y^4+A_6y^6+A_8y^8+\ldots$$

Second Embodiment:

FIG. 3 shows a lens arrangement of the fast ultra-wide angle lens system according to a second embodiment of the present invention.

Numerical data of the lens system shown in FIG. 3 is shown in Table 2 below. Diagrams of various aberrations of the lens system are shown in FIG. 3.

TABLE 2

$F_{NO} = 1:0.82$
$F = 3.80$
$\omega = 58.8$
$F_B = d_{14} + d_{15}$
(in glass) = 11.00
surface

| No. | r | d | N | ν |
|---|---|---|---|---|
| 1 | 21.469 | 2.05 | 1.77250 | 49.6 |
| 2 | 8.717 | 4.54 | | |
| 3 | 41.163 | 1.88 | 1.83481 | 42.7 |
| 4 | 9.288 | 2.78 | | |
| 5 | −42.341 | 1.13 | 1.67003 | 47.3 |
| 6 | 6.943 | 6.04 | 1.71736 | 29.5 |
| 7 | −24.852 | 16.32 | | |
| 8* | 96.974 | 4.73 | 1.66910 | 55.4 |
| 9 | −19.675 | 0.10 | | |
| 10 | 186.361 | 1.00 | 1.84666 | 23.8 |
| 11 | 12.663 | 7.96 | 1.77250 | 49.6 |
| 12 | −32.233 | 0.10 | | |
| 13 | 38.205 | 8.37 | 1.60311 | 60.7 |
| 14 | −23.598 | 5.00 | | |
| 15 | ∞ | 6.00 | 1.49782 | 66.8 |
| 16 | ∞ | | | |

*marked surface is aspherical.

surface No. 8;

K=0.0, A4=−0.97950×10⁻⁴, A6=0.10894×10⁻⁶

A8=−0.11285×10⁻⁸, A10=0.0, A12=0.0

Third Embodiment:

FIG. 5 shows a lens arrangement of the fast ultra-wide angle lens system according to a third embodiment of the present invention.

Numerical data of the lens system shown in FIG. 5 is shown in Table 3 below. Diagrams of various aberrations of the lens system are shown in FIG. 6.

TABLE 3

$F_{NO} = 1:0.82$
$F = 3.80$
$\omega = 58.7$
$F_B = d_{14} + d_{15}$
(in glass) = 11.84
surface

| No. | r | d | N | ν |
|---|---|---|---|---|
| 1 | 20.228 | 2.00 | 1.77250 | 49.6 |
| 2 | 8.908 | 4.58 | | |
| 3 | 40.882 | 1.81 | 1.83481 | 42.7 |
| 4 | 9.658 | 3.06 | | |
| 5 | −28.840 | 1.11 | 1.78590 | 44.2 |
| 6 | 11.789 | 6.85 | 1.84666 | 23.9 |
| 7 | −25.730 | 15.00 | | |
| 8* | −48.379 | 5.15 | 1.66910 | 55.4 |
| 9 | −12.528 | 0.10 | | |
| 10 | 98.265 | 1.50 | 1.84666 | 23.9 |
| 11 | 11.475 | 8.90 | 1.69680 | 55.5 |
| 12 | −32.134 | 3.24 | | |
| 13 | 72.065 | 4.81 | 1.80400 | 46.6 |

TABLE 3-continued

| | | | | |
|---|---|---|---|---|
| 14 | −22.404 | 5.84 | | |
| 15 | ∞ | 6.00 | 1.49782 | 66.8 |
| 16 | ∞ | | | |

*marked surface is aspherical.

surface No. 8;

K=0.0, A4=−0.17567×10⁻³, A6=−0.27089×10⁻⁶, A8=0.23902×10⁻⁸, A10=−0.45358×10⁻¹⁰, A12=0.0

Fourth Embodiment:

FIG. 7 shows a lens arrangement of the fast ultra-wide angle lens system according to a fourth embodiment of the present invention.

Numerical data of the lens system shown in FIG. 7 is shown in Table 4 below, Diagrams of various aberrations of the lens system are shown in FIG. 8.

TABLE 4

$F_{NO} = 1:0.82$
$F = 3.80$
$\omega = 58.7$
$F_B = d_{14} + d_{15}$
(in glass) = 11.94

| surface No. | r | d | N | υ |
|---|---|---|---|---|
| 1 | 20.744 | 2.00 | 1.77250 | 49.6 |
| 2 | 8.885 | 4.40 | | |
| 3 | 34.062 | 1.80 | 1.83481 | 42.7 |
| 4 | 9.698 | 3.13 | | |
| 5 | −25.885 | 1.44 | 1.80440 | 39.6 |
| 6 | 11.491 | 6.66 | 1.84666 | 23.9 |
| 7 | −24.688 | 16.14 | | |
| 8* | −1896.202 | 5.06 | 1.66910 | 55.4 |
| 9 | −15.207 | 0.10 | | |
| 10 | 159.406 | 1.50 | 1.84666 | 23.9 |
| 11 | 12.350 | 8.02 | 1.69680 | 55.5 |
| 12 | −35.361 | 2.85 | | |
| 13 | 48.044 | 4.96 | 1.77250 | 49.6 |
| 14 | −24.043 | 5.94 | | |
| 15 | ∞ | 6.00 | 1.49782 | 66.8 |
| 16 | ∞ | | | |

*marked surface is aspherical.

surface No. 8;

K=0.0, A4=−0.13190×10⁻³, A6=0.82970×10⁻⁷,

A8=−0.65098×10⁻¹¹, A10=−0.10199×10⁻¹⁰, A12=0.0

The values of the formulae (1) through (13) corresponding to the first through fourth embodiments are shown in table 5 below.

TABLE 5

| FORMULA | EMBODIMENT | | | |
|---|---|---|---|---|
| | 1 | 2 | 3 | 4 |
| (1) | −0.28 | −0.32 | 0.32 | −0.32 |
| (2) | 8.18 | 9.15 | 9.05 | 9.36 |
| (3) | 7.35 | 5.86 | 6.24 | 5.92 |
| (4) | −1.74 | −4.98 | −7.70 | −6.57 |
| (5) | 0.045 | 0.036 | 0.000 | 0.011 |
| (6) | 0.40 | 0.50 | 0.53 | 0.56 |
| (7) | 0.84 | 0.49 | 0.59 | 0.60 |
| (8) | 3.07 | 2.41 | 3.62 | 3.28 |
| (9) | 2.60 | 3.33 | 3.02 | 3.25 |
| (10) | 1.810 | 1.759 | 1.798 | 1.804 |
| (11) | 1.847 | 1.717 | 1.847 | 1.847 |
| (12) | 13.8 | 17.8 | 20.3 | 15.7 |

TABLE 5-continued

| FORMULA | EMBODIMENT | | | |
|---|---|---|---|---|
| | 1 | 2 | 3 | 4 |
| (13) | 2.43 | 1.83 | 3.10 | 3.02 |

As can be seen from Table 5 above, all the four embodiments satisfy the requirements defined by the formulae (1) through (13). Moreover, according to the present invention, the f-number of the fast ultra-wide angle lens system is approximately F0.8, which is very small, and the half angle of view is extremely large, i.e. around 60°. Moreover, the aberrations can be sufficiently compensated, as can be seen from the diagrams of aberrations.

As may be understood from the above discussion, in a lens arrangement including a front lens group, a diaphragm and a rear lens group, a fast ultra-wide angle lens having f-number of approximately F0.8 can be obtained when the conditions recited in the claims of the specification are satisfied.

We claim:

1. An ultra-wide angle lens system comprising:

a front lens group having a negative power, a diaphragm, and a rear lens group having a positive power, arranged in this order from an object side of the lens system, in which the following conditions are satisfied:

(1) $-0.5 < f/f_F < -0.2$ (2) $7.0 < \Sigma d_{F+S}/f < 12.0$ (3) $5.0 < \Sigma d_R/f < 10.0$ wherein, f represents a focal length of the entire lens system, $f_F$ represents a focal length of the front lens group, $\Sigma d_{F+S}$ represents a sum of the length of the front lens group and the distance between the front lens group and the rear lens group; and, $\Sigma d_R$ represents a length of the rear lens group.

2. The lens system of claim 1, wherein a lens having an aspherical surface is provided in said rear lens group, said rear lens group satisfying the following conditions:

(4) $-10.0 < \Delta I_{ASP} < -1.0$ (5) $|II_{SP}/\Delta I_{ASP}| < 0.2$ wherein, $II_{ASP}$ represents an aberration factor of the aspherical surface term of the third-order spherical aberration factor of the aspherical lens surface, $I_{SP}$ represents an aberration factor of the spherical surface term of the third-order spherical aberration factor of the aspherical lens surface.

3. The lens system of claim 1, wherein said rear lens group comprises a positive lens in which a surface facing an image is convex, a cemented lens assembly comprising a negative lens and a positive lens wherein cemented surfaces of said negative and positive lenses are concave with respect to the image surface, and a positive double convex lens, arranged in this order from the object side, and in which the following conditions are satisfied:

(6) $0.3 < f_R/f_{R-0} < 0.6$ (7) $0.4 < f_R/f_{R-i} < 0.9$ (8) $2.0 < d_{O-i}/f < 5.0$ (9) $2.0 < r_{RC}/f < 5.0$ wherein, $f_R$ represents a focal length of the rear lens group, $f_{R-O}$ represents a focal length of the positive lens nearest to the object in the rear lens group $f_{R-i}$ represents a focal length of the positive lens nearest to the image surface in the rear lens group, $d_{O-i}$ represents a distance between the rear surface of the positive lens nearest to an object and the front surface of the positive lens nearest to the image surface, in the rear lens group; and, $r_{RC}$ represents a radius of curvature of the cementing surface of the cemented lens assembly of the rear lens group.

4. The lens system of claim 1, wherein said front lens group comprises first and second negative meniscus lenses having convex surfaces facing the object side, and a cemented lens assembly having a third negative lens and a fourth positive lens in which cemented surfaces of said third lens and said fourth lens are convex with respect to the object side, arranged in this order from the object side, and wherein the following conditions are satisfied:

(10) $1.7 < (N_1 + N_2 + N_3)/3$

(11) $1.7 < N_P$

(12) $10 < v_N - v_P$

(13) $1.5 < r_{FC}/f < 5.0$ wherein, $N_1$ represents a refractive index of the first negative lens of the front lens group, $N_2$ represents a refractive index of the second negative lens of the front lens group, $N_3$ represents a refractive index of the third negative lens of the front lens group, $N_P$ represents a refractive index of the fourth positive lens of the cemented lens assembly, $v_N$ represents an Abbe number of the fourth negative lens of the cemented lens assembly, $v_P$ represents an Abbe number of the third positive lens of the cemented lens assembly, $r_{RC}$ represents a radius of curvature of the cemented surface of the cemented lens assembly.

\* \* \* \* \*

UNITED STATES PATENT AND TRADEMARK OFFICE
CERTIFICATE OF CORRECTION

PATENT NO. : 5,477,389
DATED : December 19, 1995
INVENTOR(S) : T. ITO et al.

It is certified that error appears in the above-indentified patent and that said Letters Patent is hereby corrected as shown below:

At column 10, line 45 (claim 2, line 6) change "$|I_{ASP}$" to ---$\Delta I_{ASP}$---.

Signed and Sealed this

Twenty-sixth Day of November 1996

BRUCE LEHMAN

Attest:

Attesting Officer

Commissioner of Patents and Trademarks